(No Model.)
C. L. COFFIN.
METHOD OF WELDING METALS ELECTRICALLY.
No. 423,736. Patented Mar. 18, 1890.
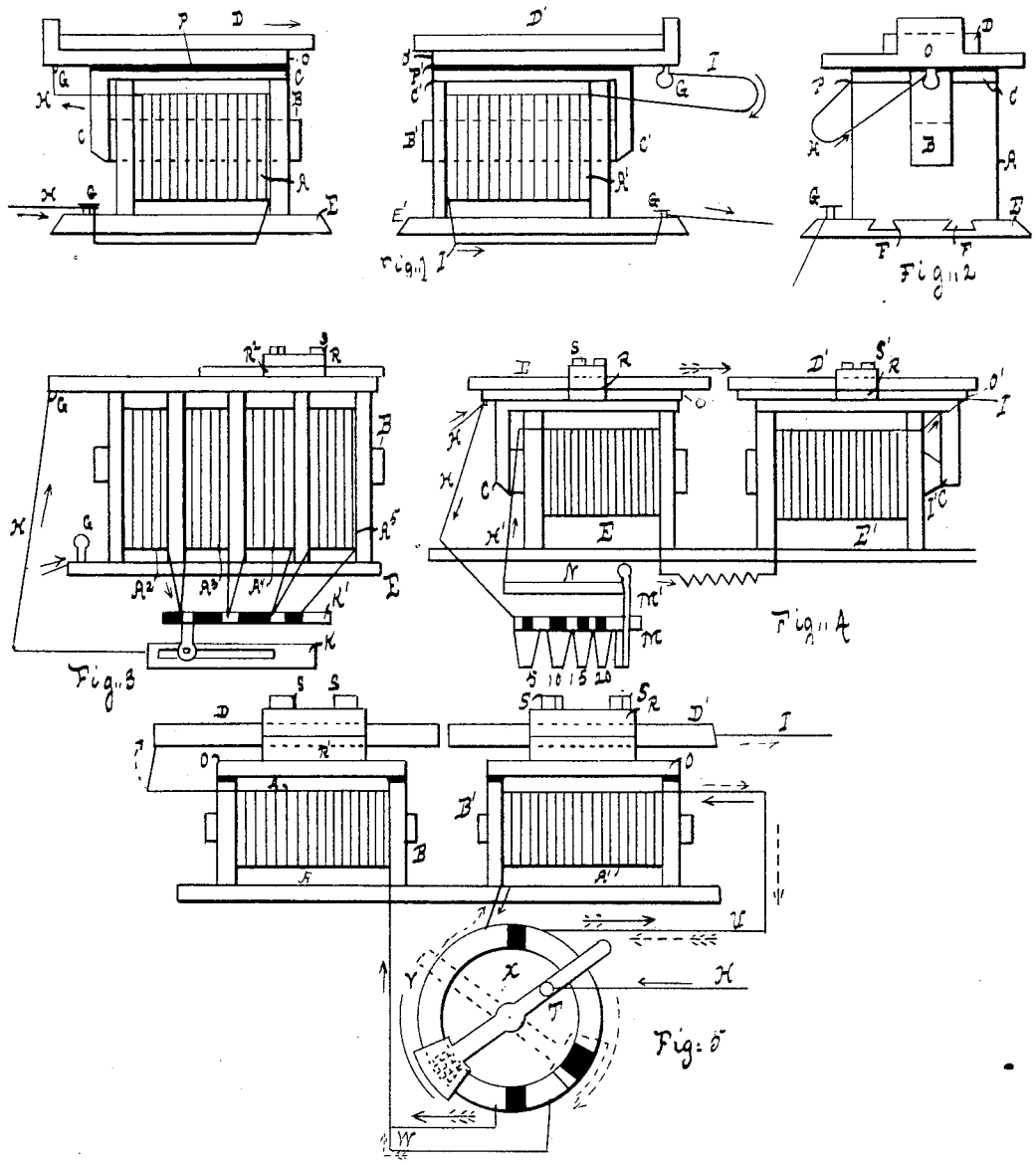

UNITED STATES PATENT OFFICE.

CHARLES L. COFFIN, OF DETROIT, MICHIGAN.

METHOD OF WELDING METALS ELECTRICALLY.

SPECIFICATION forming part of Letters Patent No. 423,736, dated March 18, 1890.

Application filed December 12, 1889. Serial No. 333,505. (No model.)

*To all whom it may concern:*

Be it known that I, CHARLES L. COFFIN, of Detroit, in the county of Wayne and State of Michigan, have invented a new and useful Improvement in Welding Metals Electrically, of which the following is a specification.

My invention consists in an improved method of welding metals electrically, hereinafter fully described and claimed.

The drawings represent various forms of apparatus by which my invention may be practiced.

Figures 1 and 2 are side and end elevations showing two articles ready to be welded. Figs. 3 and 4 are side elevations with mechanism for regulating the force of the magnets, and Fig. 5 a side elevation showing a switch for reversal of the currents.

The principal of my invention consists in forming a weld between two pieces of metal whose edges have been brought to a welding heat in any of the known modes—viz., by passing heating-currents through them while in contact, or by springing a voltaic arc between the edges, or by springing an arc between the edges to be welded and an extraneous conductor, (all of these being known methods fully described in prior patents to other parties and myself,) by pressing together the articles to be welded by the force of one or more magnets, which may be either in the direct circuit of the welding-current or in a shunt-circuit from the welding-circuit, or separately energized.

A description of Fig. 1 will fully explain my invention, and it will then be only necessary to point out the mechanical modifications illustrated in the other figures.

Relating now solely to Figs. 1 and 2, A and A' represent two electro-magnets mounted on bases E E', one or both of said magnets being movably mounted upon its base—as, for instance, by dovetail projections F, formed on the magnet and engaging with similar grooves in the base. These magnets are shown separated for convenience. In practice they will be approached until D D' are in contact or near enough together to close the circuit and form a voltaic arc between them. B B' represent cores of said electro-magnets, which mutually attract each other when the magnets are energized by both being embraced in the same circuit. C C' represent a U-shaped extension of the cores B B' of said electro-magnets, by which both poles of said cores are made to co-operate in drawing said electro-magnets toward each other. O O' represent plates of metal on the upper side of said magnets, insulated by the strip of insulating material P, upon which are clamped (by any suitable clamping mechanism) the pieces of metal D D' which are to be welded together, or they are retained in position by the upturned ends of plates O O', which bear against the rear ends of the metal pieces D D', as clearly shown in Fig. 1. G G represent binding-screws. H and I represent an electric conductor, H being connected with one pole of a generator of electricity—for example, the positive pole—and I being connected with the other pole. The conductor H is connected with one end of the bobbin of electro-magnet A, the other end of said bobbin being connected with the metal plate O or metal piece D, and the bobbin of electro-magnet A' is similarly connected with the plate O' or article D' and with the other pole of the generator through conductor I. The path of the current then entering through conductor H is through the bobbin of magnet A, binding-post G, and plate O to the piece of metal D, and thence through the metal piece D', plate O', binding-screw G, and the bobbin of electro-magnet A' and conductor I to the other pole of the generator. If the edges of D D' are in contact, the passage of the current heats them, and at the same time the magnets A A' are energized, their poles B B' attract each other and D D' are pressed together (by mutual attraction of said magnets) to form the weld. If the articles D D' are to be heated without actual contact—that is, by springing a voltaic arc between them—the approach of the magnets A A' is resisted by any mechanical means until the edges of D D' are brought to a welding heat, and then the magnets are permitted to force the heated edges together to form the weld, or the distance to which said magnets may approach each other, and consequently the amount of pressure between the heated edges of D D', may be regulated by any adjustable stop.

If it is desired to regulate the force of the magnet and the compression of D D', the bobbin of magnet A may be divided into a number of separate coils, (illustrated in Fig. 3 as $A^2$, $A^3$, $A^4$, and $A^5$,) the terminals of which are connected with contact-plates K', governed by a switch K, by means of which the operator may throw in or cut out one or more of said coils, and thus increase or decrease the power of the magnet.

In Fig. 4 the bobbins of electro-magnets A and A' are not in the main welding-circuit, but are in a shunt-circuit H' I', in which is interposed a series of resistance-coils M, connected by a plug M' with a plate N in the shunt-circuit, by which the resistance of the shunt-circuit can be increased or decreased at will. In this form the resistance to the welding-current at the point of contact between D and D' increases as the edges become heated, so that a greater proportion of the current is shunted into the circuit H' I', thereby increasing the effective force of the magnets A A' and the compression between D D' at the time when such force becomes necessary for welding.

The clamp shown in Figs. 3, 4, and 5 consists of a bottom plate R', fastened to plate O, a cap R, and bolts S for fastening the cap to the plate R', the articles D or D' being thus clamped between the cap R and the plate R'.

In Fig. 5 the switch X is for reversing the current in one of the electro-magnets when it is desired to cause them to recede from each other to bring a stress upon the joint.

The conductors H and I being connected with the poles of a generator and the articles D D' being in contact at the joint, the current enters the main H at a binding-post T on the switch X, takes the direction T U V W, through the coils of the magnet A, and into the material, its direction being indicated by the full-line arrows. When it is desired to reverse the direction of the current through H, the switch T is drawn to the left and the current then passes as shown by the dotted arrows. This changes the polarity of the coils of magnet A', and the magnets A and A' tend to repel each other, either separating the articles at the joint, or, if an incipient weld has been formed, it creates a strain at the joint, which increases the heating effect of the current.

What I claim as my invention, and desire to secure by Letters Patent, is—

1. The herein-described method of welding metals electrically, consisting in bringing the edges to be welded to a welding heat by the action of an electric current and pressing them together by the attractive force of a magnet.

2. The herein-described method of welding metals electrically, consisting in bringing the edges to be welded to a welding heat by the action of an electric current, pressing them together by the attractive force of a magnet, and putting the weld under strain while subject to the action of the welding-current.

CHARLES L. COFFIN.

Witnesses:
   CYRUS E. LOTHROP,
   GERTRUDE H. ANDERSON.